(12) United States Patent
Caldwell et al.

(10) Patent No.: US 6,748,469 B1
(45) Date of Patent: Jun. 8, 2004

(54) PARALLEL/SERIAL SCSI WITH LEGACY SUPPORT

(75) Inventors: Barry Caldwell, Hesston, KS (US); Craig C. McCombs, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 494 days.

(21) Appl. No.: 09/774,501

(22) Filed: Jan. 31, 2001

(51) Int. Cl.[7] .............................................. G06F 13/14
(52) U.S. Cl. .................................... 710/71; 710/313
(58) Field of Search .......................... 710/71, 300, 305, 710/313

(56) References Cited

U.S. PATENT DOCUMENTS

| | | | | | |
|---|---|---|---|---|---|
| 5,206,946 A | * | 4/1993 | Brunk | ......................... | 710/65 |
| 5,748,924 A | * | 5/1998 | Llorens et al. | ................. | 710/71 |
| 5,951,666 A | * | 9/1999 | Ilting et al. | .................... | 710/71 |

* cited by examiner

Primary Examiner—Glenn A. Auve
(74) Attorney, Agent, or Firm—Suiter West PC LLO

(57) ABSTRACT

The present invention is directed to a parallel/serial SCSI with legacy support. A small computer system interface (SCSI) converter module may include a small computer system interface (SCSI) converter. The converter is suitable for converting a parallel bus structure to a serial bus structure, and the converter is also suitable for supporting a parallel bus structure to a parallel bus structure.

20 Claims, 3 Drawing Sheets

PARALLEL/SERIAL SCSI WITH LEGACY SUPPORT

FIELD OF THE INVENTION

The present invention generally relates to the field of small computer system interfaces (SCSI), and particularly to a parallel/serial small computer system interface (SCSI) with legacy support.

BACKGROUND OF THE INVENTION

The Small Computer System Interface (SCSI) defines an input/output bus and logical interfaces supporting the bus of interconnecting computer and peripheral devices. This interface was developed as a standard interface for a variety of devices so that only a single adapter type was required, as opposed to previous interfaces that were configured for only a specific type of device, such as a hard disk interface for a hard disk drive, and the like. Thus, a device independent mechanism was achieved to attach and access devices to host computers that supports multiple devices, including one or more hosts. SCSI interfaces are available on a variety of systems, from desktop computers to minicomputers and supercomputers.

However, with the ever increasing speed of computers and devices, there is a need for increased speed of a SCSI bus with the ability to support legacy copper systems. Current approaches to this problem include pushing the transmission frequency up with smaller time slices. Additional added complexity has been encountered in low voltage differential (LVD) SCSI pad design to compensate for differences in wire propagation delays. Other approaches have involved adjusting signal slew rates and performing SCSI bus signal training cycles. However, signal integrity and bus transmission issues are reaching a physical end for parallel technology. The solution complexity and packaging challenges associated with a larger number of high-frequency pins has further added to the problems associated with these solutions.

Therefore, it would be desirable to provide a parallel/serial SCSI with legacy support.

SUMMARY OF THE INVENTION

Accordingly, the present invention is directed to a parallel/serial SCSI with legacy support. In a first aspect of the present invention, a small computer system interface (SCSI) converter module includes a small computer system interface (SCSI) converter. The converter is suitable for converting a parallel bus structure to a serial bus structure, and the converter is also suitable for supporting a parallel bus structure to a parallel bus structure.

In a second aspect of the present invention, a method of providing a parallel to serial SCSI connection which is suitable for supporting a parallel to parallel SCSI connection includes initiating a connection between a first bus and a second bus by a small computer system interface (SCSI) converter. A structure of the second bus is determined, the structure of the second bus including at least one of a parallel bus structure and a serial bus structure. The small computer system interface (SCSI) converter is configured based upon the determined structure of the second bus, wherein the small computer system interface (SCSI) converter is configured to support at least one of a parallel to serial small computer system interface (SCSI) connection and a parallel to parallel small computer system interface (SCSI) connection.

In a third aspect of the present invention, a small computer system interface (SCSI) converter module includes a small computer system interface (SCSI) converter. The converter is suitable for converting a parallel bus structure to a serial bus structure. The converter is also suitable for supporting a parallel bus structure to a parallel bus structure. The small computer system interface (SCSI) converter includes a first side suitable for supporting a parallel bus and a second side suitable for supporting a parallel bus and a serial bus.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
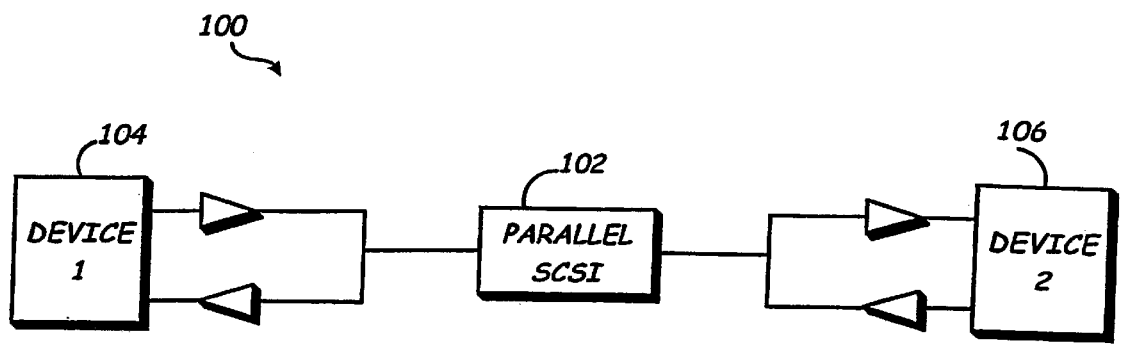
FIG. 1 is a block diagram of an exemplary embodiment of the present invention wherein parallel communication between a first device and a second device is shown.

Reference will now be made in detail to the presently preferred embodiments of the invention, examples of which are illustrated in the accompanying drawings.

Referring generally now to FIGS. 1 through 4, exemplary embodiments of the present invention are shown. The basic Small Computer System Interface (SCSI) needs more speed, the parallel bus structure as it exists now can not be pushed much farther because of signal integrity (SI) and physical limits. Further, there is a need to support legacy copper bus connections with a way to transition to parallel-serial bus structure that will allow higher data rate transfers. Therefore, there is a need to use SE/LVDS physical signaling technology to support these needed higher data rates that will maintain current bus interconnect methodology of multi-drop bus topology and physical length.

SCSI is a local input/output bus that may operate over a wide range of data rates. The SCSI specification allows for a number of different physical interconnect configurations which provide a wide range of geographic reach and data transfer speed, each of which are contemplated by the present invention. For example, configurations which utilize parallel copper wire interconnect schemes may utilize a bus length ranging from 1.5 meters to 25 meters and beyond, with data transfer range from 5 Mbytes per sec to 80 Mbytes per second and beyond. Additionally, serial optical interconnect schemes may be utilized, so that SCSI devices may be separated by great distances, such as 3 kilometers with data transfer rates of 100 Mbytes per second and beyond.

The original SCSI specification described a bus that operated at up to 5 MHz. The 5 Mbytes per second rate is a computed rate (1 Byte per period×5 million transfer periods per second). However, while this data transfer rate was theoretically achievable, the actual rate was not achieved in practice due to a number of reasons, which include the following: (1) The specification allows transfer rate below the target rate, and since the rate used is defined by the slower of two devices, a lower rate may be utilized. (2) SCSI data maybe transferred in an asynchronous manner. (3) Data is not transferred during periods needed to set up a connection (operation overhead).

The SCSI standard supports single ended and differential interface configurations. A single ended interface was typically utilized in instances wherein fewer wires or less complex chips were desired to support the SCSI bus than in a differential interface. The utilization of fewer wires allowed for smaller connectors and less cost. However, these characteristics restricted the placement of devices as well as the total length of a single ended bus to a maximum of 6 meters. Differential interfaces may be designed to span distances of up to 25 meters, which make them particularly well suited for use as an external connection between a host and a peripheral subsystem.

Additional SCSI specifications were developed to increase performance, improve compatibility, increase the number of addressable devices and improve functionality. The SCSI-2 specification allows the bus to be widened from 8-bits, to 16 bits (two-byte) or 32 bits (four-byte) wide. However, typically, 16 bit wide buses are implemented. The term "Wide" is typically utilized to refer a 16 bit (2 byte) bus, while the term "Narrow" is most often used to refer to an 8 bit wide bus. The term "Fast" is typically utilized to refer to a 10 Mbytes per second bus. Therefore, SCSI buses may include Fast SCSI, Wide SCSI and Fast Wide SCSI. A Fast SCSI bus is 8 bits in width, supports 8 devices, and has a maximum data transfer rate of 10 Mbytes per second (8 bits×10 million data transfer cycles per second). A Wide SCSI bus is 16 bits wide, supports 16 devices and has a maximum data transfer rate of 10 Mbytes per second (16 bits×5 million data transfer cycles per second). A Fast Wide SCSI bus is 16 bits in width, supports 16 devices and has a maximum data transfer rate of 20 Mbytes per second (16 bits×10 million data transfer cycles per second). Additional data transfer cycles may also be achieved utilizing "Ultra", 20 MHz, and "Ultra 2", 40 MHz.

Further, Low Voltage Differential (LVD) may be utilized to support Ultra 2 rates at increased distances, such as up to 12 meters, over Ultra, which is limited to 3 meters in single-ended configurations and 25 meters in differential configurations. LVD may also be utilized to support Fast, Wide, Ultra, and the like, at distances up to 12 meters.

To further extend the functionality of SCSI, the support of serial interfaces is necessary. In a serial interface, data and control bits are communicated sequentially, instead of in parallel, such as in IEEE 1394 (FireWire), Fibre Channel, Serial Storage Architecture (SSA), and the like. With a serial interface the command negotiation overhead may be done in a synchronous data structure format rather than the present asynchronous negotiation structure used for parallel SCSI. A serial interface may result in reduced manufacturing costs, a smaller foot print on the interface, enhanced interconnection options, increased data transfer rates, longer interconnects, more reliable connection technology, and the like. The high data transfer rates of a serial SCSI connection makes it particularly well suited for disk array applications. However, typical serial SCSI is not backward compatible with SCSI-2 or SCSI-1 devices. Therefore, there is a need to promote a transition to parallel/serial bus structure that will allow higher data rate transfers and support for legacy copper bus connections.

Figure 2:
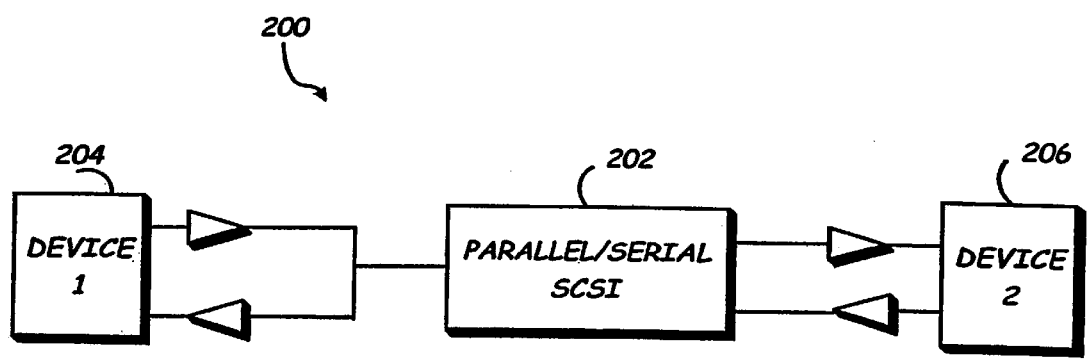
FIG. 2 is a highly diagrammatic block illustration of an exemplary embodiment of the present invention wherein parallel to serial communication between a first device and a second device is shown.

Referring now to FIGS. 1 and 2, exemplary embodiments 100 & 200 of the present invention is shown wherein a parallel/serial SCSI converter with legacy support is shown. Legacy devices, such as devices utilizing SCSI-1 and SCSI-2 utilized a parallel SCSI interface, as shown in FIG. 1. In this instance, a first peripheral device 104 communicated with a second device 106, such as a host or an additional peripheral device, utilizing a parallel SCSI 102 connection. However, the parallel bus structure may not be pushed much further due to signal integrity and the physical limits of the bus. However, a typical parallel to serial SCSI connection will only handle serial connections. Therefore, a parallel-serial SCSI connection, such as a parallel/serial SCSI converter 202 of FIG. 2, is needed to support both the parallel/serial SCSI connection between a parallel device 204 and a serial device 206 as shown in FIG. 2, as well as parallel to parallel connections for support of legacy devices, as shown in FIG. 1. In this way, support for legacy copper bus connection is achieved with a way to transition to parallel/serial bus structure that will allow higher data rate transfers. Thus, current bus interconnect methodology of multi-drop bus topology and physical length may be maintained.

Figure 3:
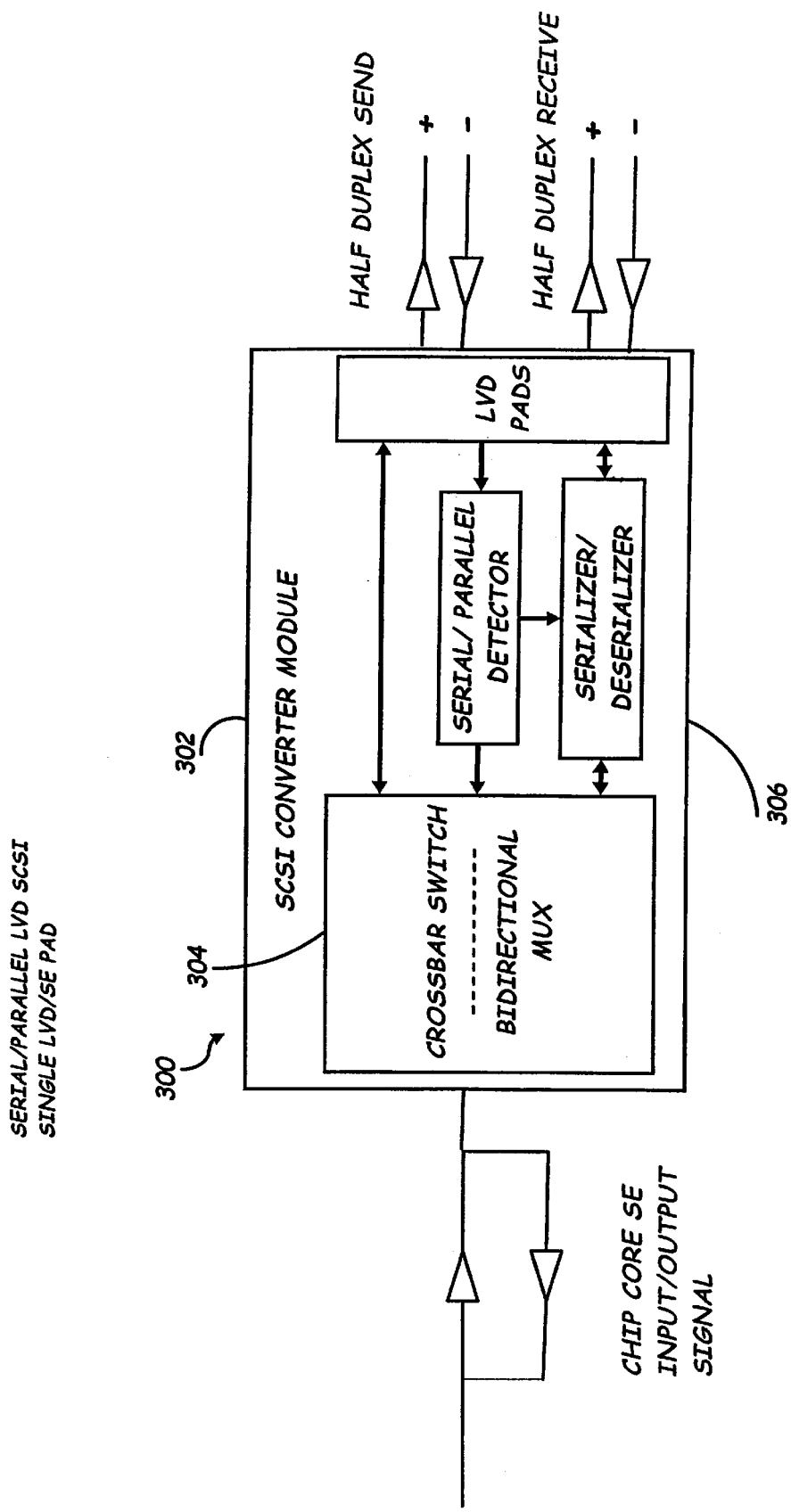
FIG. 3 is a highly diagrammatic block depiction of an exemplary embodiment of the present invention wherein a SCSI converter module suitable for providing parallel/serial communication with support for legacy connections is shown.

Referring now to FIG. 3, an exemplary embodiment 300 of the present invention is shown wherein a parallel/serial SCSI converter is capable of legacy support. A SCSI converter module 302 includes a multiplexer 304, such as a cross bar multiplexer, to switch between a parallel bus structure and serialized transmit and receive pairs. A parallel/serial detector 306 which can sense whether the bus is parallel or serial. If the bus is parallel, the converter 302 is driven parallel and the multiplexer 304 is set for parallel. If the bus is serialized, transmit/receive bus multiplexer 304 routes internal chip signals through a serializer/deserializer (SerDes) 307 to the LVD driver pad pair. In this way, the parallel/serial converter 302 may operate utilizing serialized data as well as support legacy parallel configurations.

Figure 4:
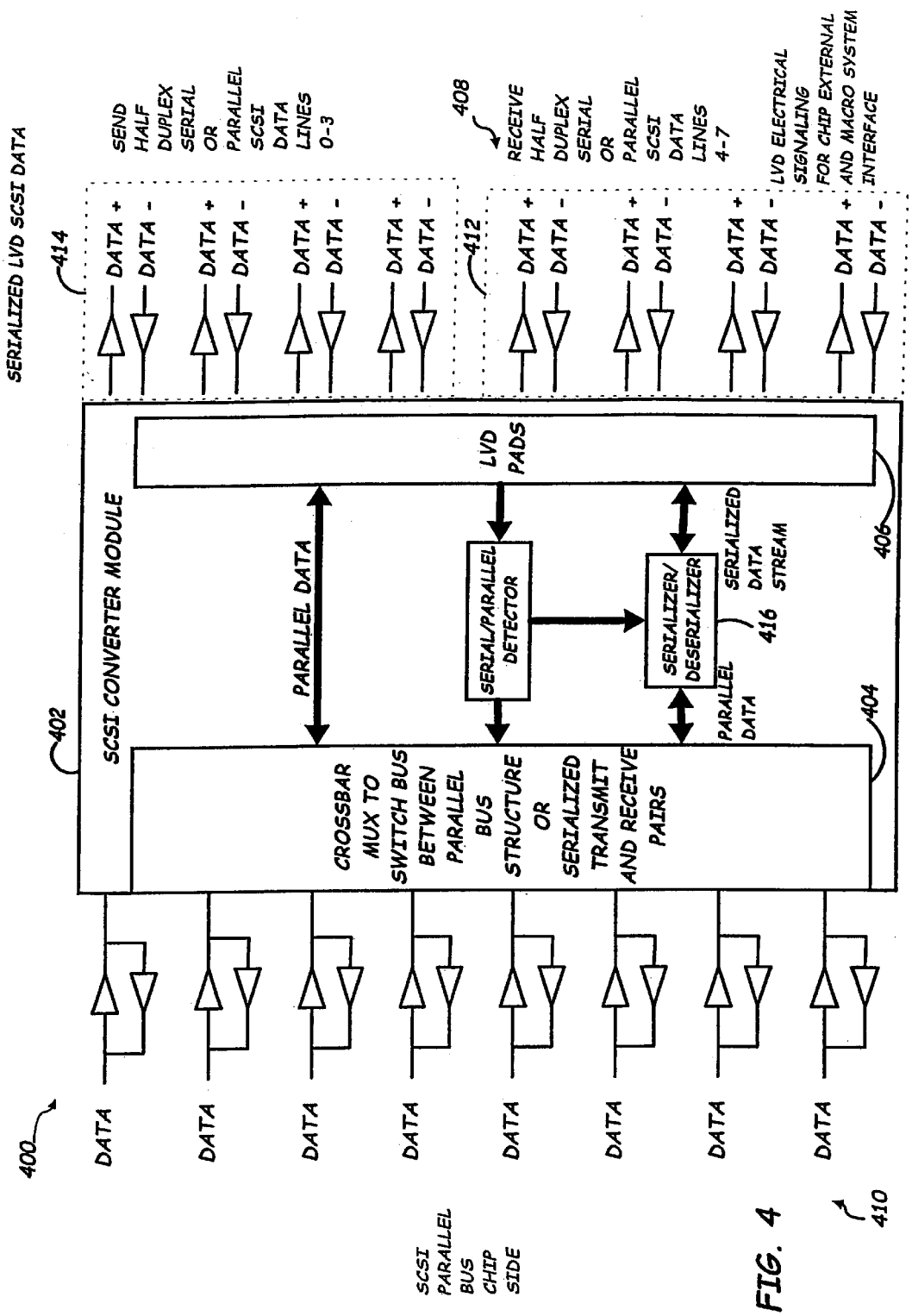
FIG. 4 is a highly diagrammatic block illustration of an exemplary embodiment of the present invention wherein a parallel to serial converter low voltage differential SCSI suitable for support of both parallel and serial buses is shown.

Referring now to FIG. 4, an exemplary embodiment 400 of the present invention is shown wherein a parallel to serial converter low voltage differential SCSI is suitable for support of both parallel and serial buses. The use of LVDS physical signaling technology may enable the support of higher data rates. A SCSI converter module 402 includes a mutiplexer/cross bar switch 404, a serial/parallel detector control circuit 418 and low voltage differential (LVD) pads 406. The SCSI converter module 402 includes a chip core input/output data side 410 and a SCSI parallel/serial bus side 408. The serial/parallel detector control circuit 418 determines if the SCSI bus is in serial 414,412 or parallel mode 408. If the SCSI bus is in parallel mode 408 the serial/parallel detector control circuit places the mux/cross bar into the parallel SCSI bus signaling mode or state. If the SCSI bus 408 is in the serial mode 414,412, the serial/parallel detector control circuit 416 places the mux/cross bar 404 into the serial SCSI bus signaling mode or state, 414,412. Should the detector circuit 418 detect serial mode it will also enable the serialize/deserializer circuit 416 for signal convertions from the chip core parallel presentation 410 to the SCSI bus encoded serial signaling state 414,412 with bi-directional signal operation. The fore going representation has dealt with the lower 8 data lines on a SCSI bus. The upper data signal could/would be dealt with in like manner as would the bus command or control signals or the whole bus. Preferably, the number of signal conductors is 8/1 or 16/2 for data with control bus retaining current 9/1 connections.

The LVD SCSI bus data side 408 groups the eight lower data lines into four serial send half duplex LVD pairs 412 and groups the remaining 4 data lines into 4 serial receive half duplex LVD pairs 414. The data lines may be grouped into four serial full duplex pairs for low order 412 & 414 and a duplicate four serial full duplex LVD pair for high order data lines, 8 thru 15. Each serial pair may have a send low voltage differential signal (LVDS) line and a receive low voltage differential signal (LVDS) line to equal one full duplex bidirectional serial line pair. For example, this may require one low voltage differential signal (LVDS) two-wire pair for each signal direction for four wires total for a signal pair. In this way, send half duplex serial and parallel SCSI data lines 0–3 414 may be provided as well as received half duplex serial and parallel SCSI data lines 4–7. The bus may have a data transfer rate of 320 Mbytes per second utilizing 8 serial lines equals 40 Mbytes per second per serial line, with 10 clocks/byte*40 $e^6$ bytes/sec equal to 400 MHz.

This method enables a standard SCSI LVD U3/ U160 or lower speed differential copper/electrically conductive cable to be used with the serial/parallel method previously described. It will also allow the use of high quality "ribbon" type cables to be used for multi-drop applications. For example, a vertically paired flat conductor ribbon cable as described in U.S. patent application Ser. No. 09/617,160, filed Jul. 17, 2000, which is herein incorporated by reference in it entirety, as well as a differential IDF wiper connector for use with differential vertical flat conductor ribbon cable as described in U.S. pat. application 09/641,736, filed Aug. 18, 2000 which is also incorporated by reference in its entirety, may be utilized by the present invention to provide increased data throughput.

A serializer/deserializer 416 may also be included between the multiplexer 404 and the serial lines 408. This would allow the data to be serialized and also encoded into 8b/10b format, although other encoding schemes, such as 4b/5b, are also contemplated by the present invention. Preferably, the serial data stream is encoded for prevention of electromagnetic interference and to ensure data integrity. The serializer/deserializer 416 may also adjust the LVD pad 406 driver strengths depending on parallel or serial operations.

The SCSI converter module 402 provides compatibility with current LVD SCSI pads, SCSI arbitration phase and SCSI asynchronous message phases. The SCSI converter module 402 uses existing SCSI negotiation techniques to configure topology and speed of the SCSI bus, and enables full duplex SCSI packet send and receive capability. The SCSI converter module also enables equivalent high-speed synchronous data transfer rates at lower frequencies. Thus, this eliminates many of the current high-speed LVD design and operational limitations, allows user of lower power LVD drivers, and leverages current serial communications advantages and applies them to parallel SCSI.

It is believed that the parallel/serial SCSI converter with legacy support of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A small computer system interface (SCSI) converter module, comprising:
a small computer system interface (SCSI) converter, the converter suitable for converting a parallel bus structure format to a serial bus structure format, the converter also suitable for supporting a parallel bus structure format to a parallel bus structure format, wherein the small computer system interface (SCSI) converter is suitable for determining whether a bus accessible to the small computer system interface (SCSI) converter is at least one of parallel and serial, and configuring the small computer system interface (SCSI) converter to support the determined at least one of parallel and serial bus, wherein the small computer system interface (SCSI) converter includes a multiplexer suitable for switching between at least one of a parallel bus structure and serialized transmit and receive pairs.

2. The small computer system interface (SCSI) converter module as described in claim 1, wherein the multiplexer is a cross bar multiplexer.

3. The small computer system interface (SCSI) converter module as described in claim 1, further comprising a serial/parallel detector circuit to determine if data is to be transmitted in serial bus structure format.

4. A small computer system interface (SCSI) converter module, comprising:
a small computer system interface (SCSI) converter, the converter suitable for converting a parallel bus structure format to a serial bus structure format, the converter also suitable for supporting a parallel bus structure format to a parallel bus structure format, wherein the small computer system interface (SCSI) converter is suitable for determining whether a bus accessible to the small computer system interface (SCSI) converter is at least one of parallel and serial, and configuring the small computer system interface (SCSI) converter to support the determined at least one of parallel and serial bus, wherein the small computer system interface (SCSI) converter includes a serializer/deserializer suitable for serializing and encoding data, wherein the serializer/deserializer adjusts low voltage differential (LVD) pad driver strength depending on at least one of parallel or serial operation.

5. A small computer system interface (SCSI) converter module, comprising:
a small computer system interface (SCSI) converter, the converter suitable for converting a parallel bus structure format to a serial bus structure format, the converter also suitable for supporting a parallel bus structure format to a parallel bus structure format, wherein the small computer system interface (SCSI) converter is suitable for determining whether a bus accessible to the small computer system interface (SCSI) converter is at least one of parallel and serial, and configuring the small computer system interface (SCSI) converter to support the determined at least one of parallel and serial bus, wherein the small computer system interface (SCSI) converter includes a serializer/deserializer suitable for serializing and encoding data, wherein the serializer/deserializer is included between a multiplexer and serial data lines.

6. The small computer system interface (SCSI) converter module as described in claim 5, further comprising a serial/parallel detector coupled to the serializer/deserializer.

7. A small computer system interface (SCSI) converter module, comprising:

a small computer system interface (SCSI) converter, the converter suitable for converting a parallel bus structure format to a serial bus structure format, the converter also suitable for supporting a parallel bus structure format to a parallel bus structure format, wherein the small computer system interface (SCSI) converter includes a first side suitable for supporting a parallel bus and a second side suitable for supporting a parallel bus and a serial bus, wherein the second side includes data lines grouped for supporting half duplex serial send and half duplex serial receive, the data lines also suitable for supporting parallel SCSI data lines.

8. A method of providing a parallel to serial SCSI connection which is suitable for supporting a parallel to parallel SCSI connection, comprising:

initiating a connection between a first bus and a second bus by a small computer system interface (SCSI) converter;

determining a structure of the second bus, the structure of the second bus including at least one of a parallel bus structure and a serial bus structure; and configuring the small computer system interface (SCSI) converter based upon the determined structure of the second bus, wherein the small computer system interface (SCSI) converter is configured to support at least one of a parallel to serial small computer system interface (SCSI) connection and a parallel to parallel small computer system interface (SCSI) connection, wherein configuring includes setting a multiplexer to switch a bus between at least one of a parallel bus structure format and serialized transmit and receive pairs.

9. The method as described in claim 8, wherein the parallel SCSI data lines are suitable for supporting legacy copper bus connections.

10. A method of providing a parallel to serial SCSI connection which is suitable for supporting a parallel to parallel SCSI connection, comprising:

initiating a connection between a first bus and a second bus by a small computer system interface (SCSI) converter;

determining a structure of the second bus, the structure of the second bus including at least one of a parallel bus structure and a serial bus structure; and configuring the small computer system interface (SCSI) converter based upon the determined structure of the second bus, wherein the small computer system interface (SCSI) converter is configured to support at least one of a parallel to serial small computer system interface (SCSI) connection and a parallel to parallel small computer system interface (SCSI) connection, wherein the first bus is a SCSI parallel bus chip side and a second side is suitable for operating as serialized low voltage differential (LVD) data lines and parallel SCSI data lines.

11. The method as described in claim 10, wherein the serialized low voltage differential (LVD) data lines includes at least one full duplex bidirectional serial line pair.

12. The method as described in claim 10, wherein the parallel SCSI data lines are suitable for supporting legacy copper bus connections.

13. A small computer system interface (SCSI) converter module, comprising:

a small computer system interface (SCSI) converter, the converter suitable for converting a parallel bus structure format to a serial bus structure format, the converter also suitable for supporting a parallel bus structure format to a parallel bus structure format, and wherein the small computer system interface (SCSI) converter includes a first side suitable for supporting a parallel bus and a second side suitable for supporting a parallel bus and a serial bus, wherein the second side includes data lines grouped for supporting half duplex serial send and half duplex serial receive, the data lines also suitable for supporting parallel SCSI data lines.

14. The small computer system interface (SCSI) converter module of claim 13, wherein the SCSI data lines are included in an 8 bit wide Fast SCSI bus.

15. The small computer system interface (SCSI) converter module of claim 13, wherein the SCSI data lines are included in a 16 bit wide Wide SCSI bus.

16. The small computer system interface (SCSI) converter module of claim 13, wherein the SCSI data lines are included in a 32 bit wide Fast Wide SCSI bus.

17. A small computer system interface (SCSI) converter module, comprising:

a small computer system interface (SCSI) converter, the converter suitable for converting a parallel bus structure format to a serial bus structure format and for supporting a parallel bus structure format to a parallel bus structure format, wherein the small computer system interface (SCSI) converter includes a first side suitable for supporting a parallel bus and a second side suitable for supporting a parallel bus and a serial bus, wherein the small computer system interface (SCSI) converter is suitable for determining whether a bus accessible to the small computer system interface (SCSI) converter is at least one of parallel and serial, and configuring the small computer system interface (SCSI) converter to support the determined at least one of parallel and serial bus, wherein the small computer system interface (SCSI) converter includes a multiplexer suitable for switching between at least one of a parallel bus structure and serialized transmit and receive pairs.

18. A small computer system interface (SCSI) converter module, comprising:

a small computer system interface (SCSI) converter, the converter suitable for converting a parallel bus structure format to a serial bus structure format, the converter also suitable for supporting a parallel bus structure format to a parallel bus structure format, and wherein the small computer system interface (SCSI) converter includes a first side suitable for supporting a parallel bus and a second side suitable for supporting a parallel bus and a serial bus, wherein the small computer system interface (SCSI) converter includes a serializer/deserializer suitable for serializing and encoding data, wherein the serializer/deserializer adjusts LVD pad driver strength depending on at least one of parallel and serial operation.

19. A small computer system interface (SCSI) converter module, comprising:

a small computer system interface (SCSI) converter, the converter suitable for converting a parallel bus structure format to a serial bus structure format, the converter also suitable for supporting a parallel bus structure format to a parallel bus structure format, and wherein the small computer system interface (SCSI) converter includes a first side suitable for supporting a parallel bus and a second side suitable for supporting a parallel bus and a serial bus, wherein the small computer system interface (SCSI) converter includes a serializer/deserializer suitable for serializing and encoding data, wherein the serializer/deserializer is included between a multiplexer and serial data lines.

20. A small computer system interface (SCSI) converter module, comprising:

a small computer system interface (SCSI) converter, the converter suitable for converting a parallel bus structure format to a serial bus structure format, the converter also suitable for supporting a parallel bus structure format to a parallel bus structure format, and wherein the small computer system interface (SCSI) converter includes a first side suitable for supporting a parallel bus and a second side suitable for supporting a parallel bus and a serial bus, wherein the small computer system interface (SCSI) converter includes a serializer/deserializer suitable for serializing and encoding data, wherein a serial synchronous command and arbitration format and structure is used.

* * * * *